United States Patent
Matsuo et al.

(10) Patent No.: US 6,344,434 B1
(45) Date of Patent: *Feb. 5, 2002

(54) ACRYLIC POLYMER, PROCESS FOR THE PRODUCTION OF THE SAME, BIODEGRADABLE BUILDER, DETERGENT COMPOSITION AND DISPERSANT

(75) Inventors: Shigeru Matsuo, Yamaguchi; Seiji Takahashi, deceased, late of Saitama; by Takeo Takahashi, executor, Saitama; by Shige Takahashi, executor, Saitama; Shinji Ito, Yamaguchi, all of (JP)

(73) Assignee: Idemitsu Kosan Co., LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,841
(22) PCT Filed: Apr. 2, 1997
(86) PCT No.: PCT/JP97/01145
§ 371 Date: Jul. 23, 1999
§ 102(e) Date: Jul. 23, 1999
(87) PCT Pub. No.: WO97/38029
PCT Pub. Date: Oct. 16, 1997

(30) Foreign Application Priority Data
Apr. 4, 1996 (JP) .............................. 8-082820
Jul. 31, 1996 (JP) .............................. 8-201949

(51) Int. Cl.$^7$ .................. C08F 20/06; C08F 4/34; C11D 3/37; B01F 17/52
(52) U.S. Cl. ............... 510/476; 510/531; 510/475; 510/477; 510/230; 510/361; 510/434; 510/533
(58) Field of Search ................. 510/531, 475, 510/476, 477, 230, 361, 434, 533

(56) References Cited

U.S. PATENT DOCUMENTS 5,104,951 A * 4/1992 Seelmann-Eggebert et al. . 526/240
5,439,997 A * 8/1995 Hales et al. ................. 526/240
5,925,610 A * 7/1999 Austin et al. ................ 510/361

FOREIGN PATENT DOCUMENTS

| EP | 608845 A2 | * | 8/1994 |
| EP | 676422 A1 | * | 10/1995 |
| JP | 60-44570 | * | 3/1985 |
| JP | 3-72502 | * | 3/1991 |
| JP | 6-41206 | * | 2/1994 |

* cited by examiner

Primary Examiner—Mark Kopec
Assistant Examiner—Brian P. Mruk
(74) Attorney, Agent, or Firm—Oblon, Spivak, McClelland, Maier & Neustadt, P.C.

(57) ABSTRACT

An acrylic polymer containing at least one terminal group of general formula (I),

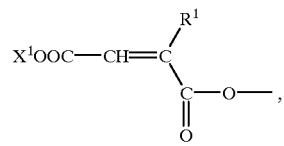

in the molecule and having a number-average molecular weight of 300 to 100,000; and a process for the preparation of the polymer, (where $R^1$ is hydrogen or methyl; and $X^1$ is hydrogen, alkali metal or ammonium) The invention provides acrylic polymer free from discoloration, excellent in chelating power, and biodegradable, a builder comprising the polymer, a detergent composition comprising the builder and a surfactant, a dispersant comprising a salt of the polymer, and processes for preparing them efficiently.

9 Claims, 3 Drawing Sheets

ACRYLIC POLYMER, PROCESS FOR THE PRODUCTION OF THE SAME, BIODEGRADABLE BUILDER, DETERGENT COMPOSITION AND DISPERSANT

TECHNICAL FIELD

The present invention relates to a novel acrylic polymer or oligomer, a method for producing it, a biodegradable builder comprising the acrylic polymer or oligomer as a main component, a detergent composition containing the biodegradable builder, and a dispersant. More precisely, the invention relates to a novel acrylic polymer having a specific terminal group, a method for producing it, a biodegradable builder for detergent comprising the polymer as a main component, a detergent composition containing the builder, and a dispersant as prepared by neutralizing the acrylic polymer.

BACKGROUND ART

In general, detergent comprising surfactant as a main component contains a builder as an auxiliary component to the surfactant to thereby improve its detergency. As the builder, known are inorganic compounds which are alkaline in water, and polymers of unsaturated aliphatic carboxylic acids. As examples of the former, mentioned are sodium or potassium carbonates, hydrogencarbonates, phosphates, polyphosphates and silicates, as well as zeolite, etc.; while examples of the latter include polyacrylic acid, polymaleic acid, polyitaconic acid, etc.

Of those builders, much used are phosphates, polyphosphates and zeolite, as they are effective, economical and easy to handle. However, these are problematic from the viewpoint of the protection of the global environment in that phosphates and polyphosphates eutrophicate lakes, marshes and rivers while zeolite precipitates on the ground.

Accordingly, it is desired to develop some other builders of which the capability (especially, the chelating ability) is, needless-to-say, good and is at least comparable to that of the conventional builders, which are biodegradable to be gentle to the environment, without remaining for a long period of time on the earth, and are therefore not problematic from the viewpoint of the protection of the global environment, and which are economical.

Given that situation, Japanese Patent Application Laid-Open (JP-A) No. Hei-5-239127 discloses chelatable and biodegradable, hydrophilic crosslinked polymers for builders. To prepare the polymers, water-soluble oligomers, which have little chelatability by themselves but contain biodegradable low-molecular components in some degree, are crosslinked at their main chains with a crosslinking agent, such as polyethylene glycol, citric acid, tartaric acid or the like, via a biodegradable ester or amido group to thereby increase their molecular weight, and the resulting crosslinked polymers are modified to have chelatability.

However, though having a low molecular weight, the linear polyacrylic acid moiety in those hydrophilic crosslinked polymers is hardly biodegradable, and, in addition, the polymers contain non-biodegradable high-molecular polyacrylic acids to no small extent. Therefore, the biodegradability of the hydrophilic crosslinked polymers disclosed is not satisfactory. In addition, the disclosed method for producing the polymers requires two steps, one for polymerizing the oligomer and the other for crosslinking the polymerized oligomer, and requires the special crosslinking agent. Accordingly, desired are chelatable and biodegradable polymers for builders capable of being produced through more simple steps, and a method for producing such polymers.

Of the conventional builders noted above, acrylic polymers such as polyacrylic acid are specifically noted as being easy to produce through simple polymerization and being polycarboxylic acids having good chelatability. To produce those acrylic polymers, in general, used is hydrogen peroxide as the polymerization initiator (catalyst). Hydrogen peroxide is preferred, as its residue remains little in the polymer formed. However, where acrylic monomers are neutralized with an ordinary base and then polymerized in the presence of the polymerization initiator, hydrogen peroxide, the polymerization efficiency is low. For this, proposed was a method of adding a metal such as iron or cobalt, or an amine to the polymerization system. However, the method is problematic in that the polymers produced are often colored, and therefore its use is limited. In addition, where acrylic monomers are neutralized with an ordinary base and then polymerized in the presence of the polymerization initiator, hydrogen peroxide to obtain acrylic oligomers, a large amount of the polymerization initiator, hydrogen peroxide is needed. This is problematic, and the problem must be solved.

In the field of dispersants for inorganic pigments, sodium polyacrylate or the like is used for lowering the viscosity of slurry dispersions and for improving the viscosity stability thereof. However, polyacrylic acid is not biodegradable as so mentioned above. Also in this field, therefore, it is desired to develop some other dispersants which are biodegradable without remaining on the earth for a long period of time and which are economical, like the builders mentioned above.

DISCLOSURE OF THE INVENTION

Given that situation, the object of the present invention is to provide a colorless, chelatable, biodegradable and economical acrylic polymer, an efficient method for producing it, a builder which comprises the polymer and is free from environmental pollution or destruction, a detergent with good detergency comprising the builder and surfactant, and a dispersant for inorganic pigments.

In order to attain the object, we, the present inventors have assiduously studied, and, as a result, have succeeded in obtaining an acrylic polymer having a specific terminal group (the terminology "acrylic polymer" as referred to herein shall include acrylic oligomers and polymers). We have found that the polymer is colorless, chelatable, biodegradable and economical, and can be produced efficiently in a simple process, that, when a builder comprising the polymer is combined with surfactant, an advantageous detergent composition is obtained, and that an alkali salt of the polymer is useful as a dispersant for inorganic pigments. On the basis of these findings, we have completed the present invention.

Specifically, the invention provides the following:

(1) An acrylic polymer having, in the molecule, at least one terminal group of a general formula (I):

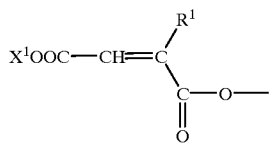

wherein $R^1$ represents a hydrogen atom, or a methyl group; and $X^1$ represents a hydrogen atom, an alkali metal atom, or an ammonium group, and having a number-average molecular weight of from 300 to 100,000.

(2) The acrylic polymer of (1), which has a plurality of ester bonds in the molecular chain.

(3) The acrylic polymer of (1), which, after having been hydrolyzed, has a number-average molecular weight of from 100 to 10,000.

(4) The acrylic polymer of (2), which, after having been hydrolyzed, has a number-average molecular weight of from 100 to 10,000.

(5) An acrylic polymer having at least one terminal group of HOOC—CH=CH—COO— in the molecule, having a plurality of ester bonds in the molecular chain, and having a number-average molecular weight of from 300 to 100,000.

(6) The acrylic polymer of (5), which, after having been hydrolyzed, has a number-average molecular weight of from 100 to 10,000.

(7) A biodegradable builder comprising an acrylic polymer as a main component which has, in the molecule, at least one terminal group of $X^1$OOC—CH=CH—COO— (where $X^1$ represents a hydrogen atom, an alkali metal atom, or an ammonium group) and has a plurality of ester bonds in the molecular chain and which has a number-average molecular weight of from 300 to 100,000.

(8) The biodegradable builder of (7) comprising an acrylic polymer as a main component which, after having been hydrolyzed, has a number-average molecular weight of from 100 to 10,000.

(9) A method for producing an acrylic polymer, comprising polymerizing an acrylic monomer in the presence of an initiator of a percarboxylic acid of a general formula (II):

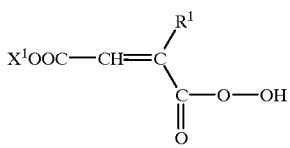

wherein $R^1$ represents a hydrogen atom, or a methyl group; and $X^1$ represents a hydrogen atom, an alkali metal atom, or an ammonium group.

(10) The method for producing an acrylic polymer of (9), wherein $X^1$ and $R^1$ in formula (II) are hydrogen atoms.

(11) A method for producing an acrylic polymer, comprising polymerizing an acrylic monomer in the presence of a reaction product of maleic anhydride and hydrogen peroxide.

(12) A detergent composition comprising from 1 to 40% by weight of at least one biodegradable builder of (7), from 1 to 40% by weight of surfactant, and from 20 to 98% by weight of the remainder comprising any of enzyme, bleaching agent and inorganic builder.

(13) A detergent composition comprising from 1 to 40% by weight of at least one biodegradable builder of (8), from 1 to 40% by weight of surfactant, and from 20 to 98% by weight of the remainder comprising any of enzyme, bleaching agent and inorganic builder.

(14) A dispersant as prepared by neutralizing an acrylic polymer, which has, in the molecule, at least one terminal group of $X^1$OOC—CH=CH—COO— (where $X^1$ represents a hydrogen atom, an alkali metal atom, or an ammonium group) and has a plurality of ester bonds in the molecular chain and which has a number-average molecular weight of from 300 to 100,000, with an alkali.

(15) The dispersant of (14), which, after having been hydrolyzed, has a number-average molecular weight of from 100 to 10,000.

BEST MODES OF CARRYING OUT THE INVENTION

Figure 1:
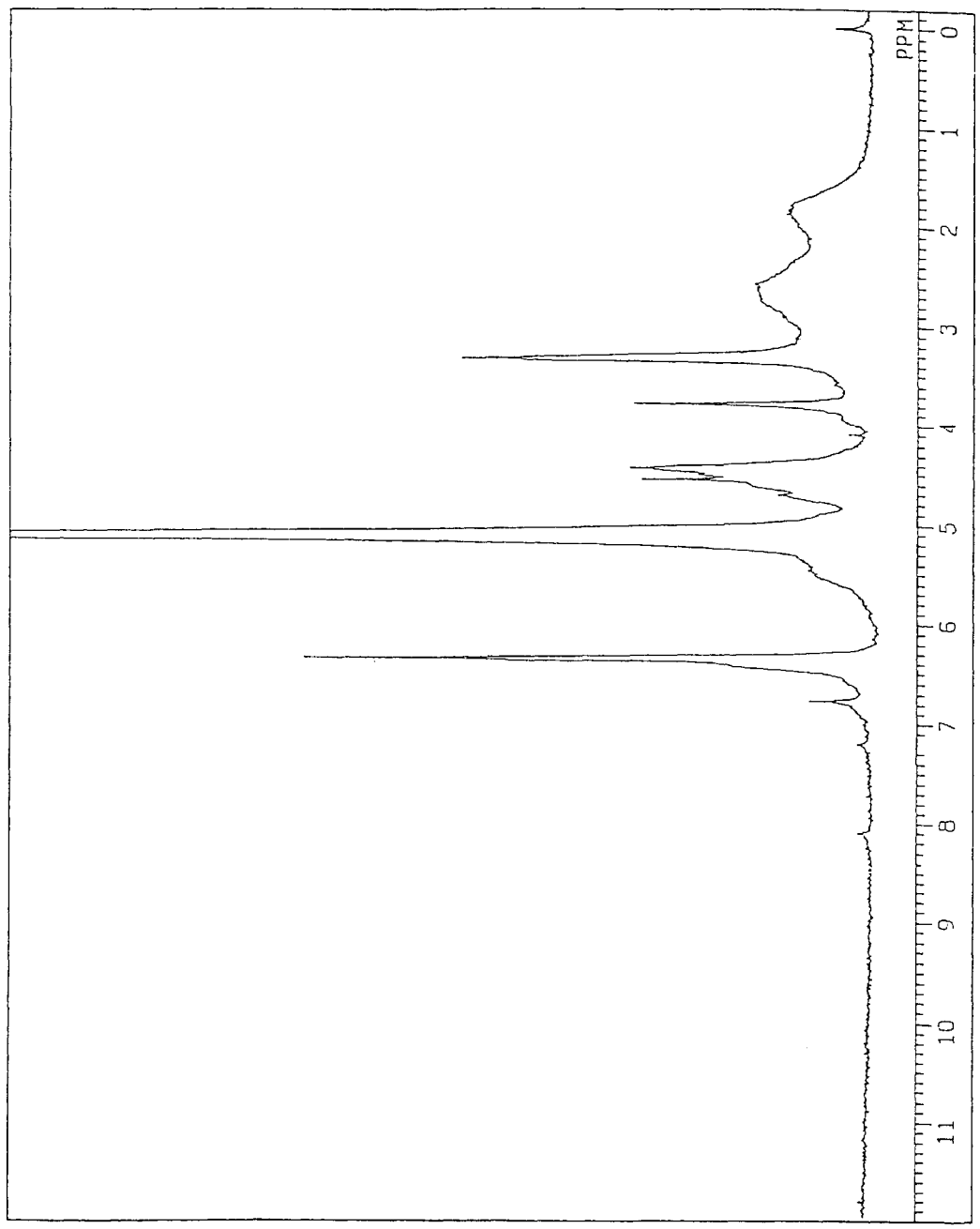
FIG. 1 is a $^1$H-NMR chart (in a solvent of heavy methanol) of the acrylic polymer obtained in Example 1.

The acrylic polymer of the invention is prepared by polymerizing an acrylic monomer such as acrylic acid. This has, in the molecule, at least one specific terminal group of a general formula (I):

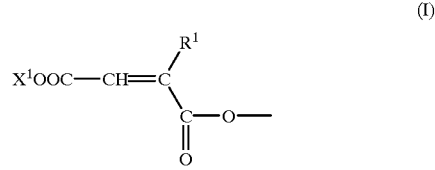

wherein $R^1$ represents a hydrogen atom, or a methyl group; and $X^1$ represents a hydrogen atom, an alkali metal atom, or an ammonium group, and has a number-average molecular weight of from 300 to 100,000. The acrylic polymer has an essential structural unit of the following:

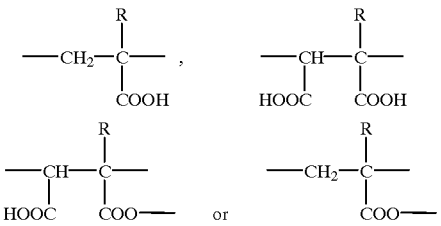

wherein R is a hydrogen atom or a methyl group.

The acrylic polymer of the invention, which has the specific terminal group as noted above and has a relatively small number-average molecular weight, has heretofore been unknown and has been disclosed herein for the first time. This is characterized by its water-solubility and biodegradability. In addition, like other conventional polycarboxylic acid-based polymers, the polymer of the invention has high chelatability to sequester poly-valent metals. Therefore, the polymer of the invention has many applications, for example, as a remover for harmful metals, etc., especially as a component of detergent not causing the destruction of the global environment.

If their molecular weight is increased, conventional acrylic polymers may have increased chelatability, but their biodegradability is lowered with the increase in their molecular weight. Being different from such conventional acrylic polymers, the specific acrylic polymer of the invention has a specific ester bond at its molecular terminal or its side chain terminal. Because of its specific molecular structure, the acrylic polymer is significantly characterized in that its biodegradability is not lowered even though its molecular weight is increased.

Accordingly, the number-average molecular weight of the acrylic polymer of the invention is most suitably from 300 to 100,000. As opposed to this, polymers having a number-average molecular weight of smaller than 300 are problematic in the chelatability, while those having a number-average molecular weight of larger than 100,000 are also problematic in the biodegradability, and those polymers could not attain the object of the invention.

The terminal residue content of the polymer of the invention can be determined through $^1$H-NMR. Specifically, the ratio of the peak area, b, derived from the protons in —CH=CH— in the terminal group of the polymer to the peak area, a, derived from the protons in the main chain of the polymer, concretely, the underlined protons in the following

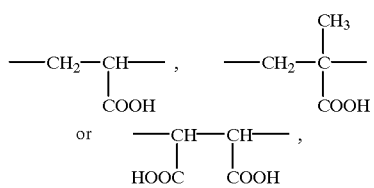

that is, [(b/a)×100(%)], is preferably not smaller than 0.1%, more preferably from 0.2 to 5.0%.

If the ratio is smaller than 0.1 9, the terminal residue content of the polymer relative to the main chain thereof shall be small, or that is, the molecular weight of the polymer of which the ester group has been cleaved is to be too large, resulting in that the polymer could not be biodegradable.

For example, where the terminal group of the polymer is a maleic acid residue, the terminal residue content of the polymer may be obtained in terms of the ratio of the peak area, b, derived from the protons in —CH=CH— in the terminal maleic acid residue at from 6.3 to 6.6 ppm (with excepting the peak area for non-reacted maleic acid) to the peak area, a, derived from the protons in the main chain of the polymer such as those noted above at from 1.0 to 3.6 ppm, or that is, in terms of [(b/a)×100(%)].

In one preferred embodiment of the acrylic polymer of the present invention, the polymer has, after having been hydrolyzed under the condition mentioned hereinunder, a number-average molecular weight of from 100 to 10,000. The polymer of this preferred embodiment may be prepared according to the method that will be mentioned hereinunder, and its structure may be represented by the general formula (III) mentioned below, in which low-molecular acrylic polymer moieties each having a number-average molecular weight of from 100 to 10,000 are bonded to each other via an ester bond. In the polymer of that type, it is believed that the ester bonds may act to improve the biodegradability of the polymer.

The presence of those ester bonds can be confirmed through $^1$H-NMR that indicates the peak area as derived from the protons in —COO—CH$_2$— at from 4.3 to 4.7 ppm.

The acrylic polymer of the invention generally has a terminal group of —OH, which can be confirmed through $^1$H-NMR that indicates —CH$_2$OH or —CH(OH)COOH. For the terminal OH content of the polymer, it is desirable that the ratio of the sum, c, of the peak area as derived from the underlined protons in —CH$_2$OH at from 3.80 to 3.90 ppm and the peak area as derived from the underlined proton in —CH(OH)COOH at from 3.94 to 4.10 ppm, to the peak area, b, derived from the protons in —CH=CH— in the terminal group of the polymer, or that is, [(c/b)×100(%)] is not smaller than 50%, more preferably from 100 to 300%.

If the ratio is smaller than 50%, the number of the specific terminal groups is small in the polymer that grows while starting from the specific terminal group, or that is, the number of low-molecular acrylic polymer units to be bonded to each other via an ester bond to give the intended grown polymer is small, resulting in that the grown polymer could not have the intended degree of biodegradability.

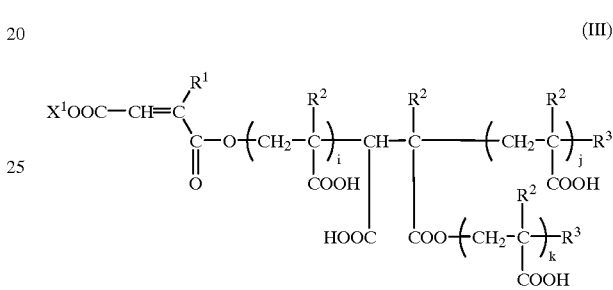

(III)

wherein R$^1$ and X$^1$ have the same meanings as above;

R$^2$ and R$^3$ each independently represent an alkyl group having from 1 to 8 carbon atoms, a hydrogen atom, or —OH;

i, j and k each represent an integer of from 0 to 1400.

In the preferred embodiment of the invention, the acrylic polymer has, after having been hydrolyzed, a number-average molecular weight of from 100 to 10,000, more preferably from 100 to 5,000, even more preferably from 100 to 2,500. Polymers having a number-average molecular weight of larger than 10,000, after having been hydrolyzed, will have poor biodegradability.

In a more preferred embodiment of the invention, the acrylic polymer has a terminal group of HOOC—CH=CH—COO—. The acrylic polymer of this embodiment has higher biodegradability.

As acrylic monomers to produce the acrylic polymer of the invention, preferably used are maleic anhydride, maleic acid, fumaric acid and the like for the monomers to give the terminal group of the polymer. As the comonomers to be copolymerized with those, preferred are acrylic acid, methacrylic acid, maleic acid, etc.

The acrylic monomers, maleic anhydride and others that form the terminal group of the acrylic polymer of the invention may be homo-polymerized to give homopolymers, or may be copolymerized with comonomers of acrylic acid, methacrylic acid and the like to give copolymers composed of two or more different acrylic monomer units. In the latter, copolymers composed of two or more different monomer units, the ratio of those monomer units may be freely determined, depending on the ratio of the monomers to be copolymerized.

One preferred combination to give the acrylic polymer of the invention is comprised of from 25 to 75 mol % of maleic anhydride or maleic acid and from 25 to 75 mol % of acrylic acid and/or methacrylic acid, since the acrylic polymer produced from this combination has good chelatability and biodegradability, and since in the method of producing the acrylic polymer from this combination, the necessary percarboxylic acid is formed efficiently and the molecular weight of the polymer being formed is easy to control. More preferred is a combination comprised of from 25 to 75 mol % of maleic anhydride and from 25 to 70 mol % of maleic acid.

Apart from the structure to be derived from the acrylic monomers noted above, the acrylic polymer of the invention may further has, in its main chain or at its terminals, structural units based on polymerizable unsaturated compounds of a general formula (IV):

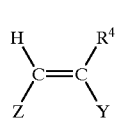

(IV)

wherein $R^4$ represents a hydrogen atom, a methyl group, —OH, or —COX$^1$; Y and Z each represent a hydrogen atom, a chlorine atom, —COOX$^1$,—SO$_3$X$^1$, —OH, —OCOR", —COR", —CONH$_2$, —COOOH, or —CHO; X$^1$ represents a hydrogen atom, an alkali metal atom (e.g., sodium, potassium, lithium), or an ammonium group; and R" represents an alkyl group having from 1 to 12 carbon atoms.

The polymerizable unsaturated compounds include, for example, itaconic acid, crotonic acid, α-hydroxyacrylic acid, vinylsulfonic acid, allylsulfonic acid, vinyltoluenesulfonic acid, and their alkali metal salts, ammonium salts, esters with alcohols having from 1 to 12 carbon atoms; as well as acrylamide, itaconic anhydride, acrolein, etc.

The acrylic polymer of the invention may contain the structural units of those polymerizable unsaturated compounds in an amount of from 1 to 50 mol % relative to from 50 to 99 mol % of the acrylic monomer units.

The method for producing the acrylic polymer of the invention is characterized by polymerizing an acrylic monomer in the presence of a polymerization initiator of a percarboxylic acid of a general formula (II):

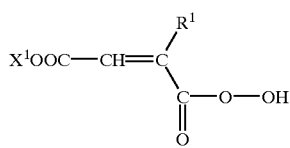

(II)

wherein $R^1$ represents a hydrogen atom, or a methyl group; and $X^1$ represents a hydrogen atom, an alkali metal atom, or an ammonium group.

The percarboxylic acid is preferably formed by reacting an acrylic monomer capable of giving the percarboxylic acid with hydrogen peroxide. As hydrogen peroxide, generally used is aqueous, 25 to 75 wt. % hydrogen peroxide, but preferred is aqueous, 30 to 70 wt. % hydrogen peroxide.

More preferably, the percarboxylic acid is formed in a method of reacting an acid anhydride with hydrogen peroxide. In this, where maleic anhydride is used, it is cleaved with hydrogen peroxide. In this, therefore, it is believed that hydrogen peroxide acts as a polymerization initiator. Specifically, it is presumed that the percarboxylic acid (V) as formed through the cleavage of the anhydride with hydrogen peroxide may react with an acrylic monomer to give the acrylic polymer of the invention which has the group of formula (I) at its molecular terminal or side chain terminal, according to the following reaction scheme.

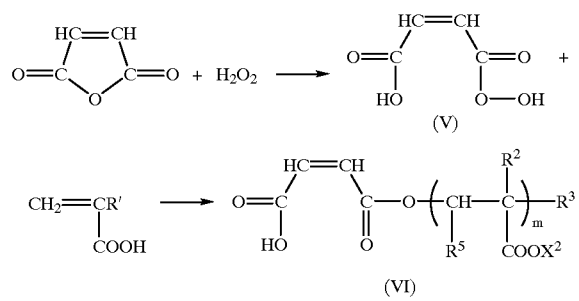

wherein;

$X^2$ represents a hydrogen atom or

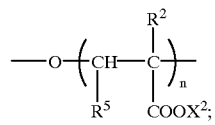

and $X^2$ of not hydrogen indicates a branched structure;

R' represents an alkyl group having from 1 to 8 carbon atoms, and includes $R^2$ and $R^3$;

$R^2$ and $R^3$ each independently represent an alkyl group having from 1 to 8 carbon atoms, a hydrogen atom, or —OH;

$R^5$ represents a hydrogen atom, or —COOH; and m and n each represent an integer of from 2 to 1400.

Alternatively, in the presence of a reaction product of an acrylic monomer and hydrogen peroxide, maleic anhydride may be reacted with hydrogen peroxide and then polymerized with an acrylic monomer. In this process, obtained is a mixture of an acrylic polymer having the specific terminal group at its molecular terminal or side chain terminal, and an acrylic polymer not having the specific terminal group.

Naturally, it is believed that the reaction using the specific acid anhydride produces a mixture of an acrylic polymer (VI) having the specific terminal group and an acrylic polymer (VII) not having it, according to the reaction step mentioned below.

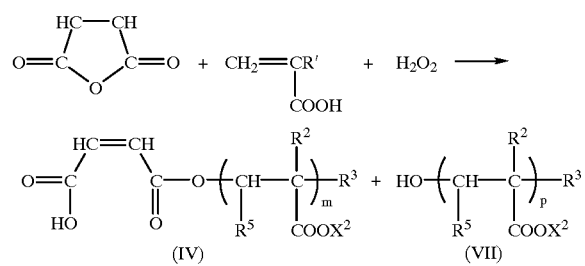

wherein;

$X^2$ represents a hydrogen atom or

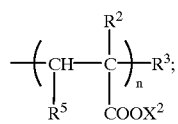

and $X^2$ of not hydrogen indicates a branched structure; R' represents an alkyl group having from 1 to 8 carbon atoms, and includes $R^2$ and $R^3$;

$R^2$ and $R^3$ each independently represent an alkyl group having from 1 to 8 carbon atoms, a hydrogen atom, or —OH;

$R^5$ represents a hydrogen atom, or —COOH; and m, n and p each represent an integer of from 2 to 1400.

For the reaction of maleic anhydride with hydrogen peroxide, preferably, the concentration of the reactants is from 20 to 80% by weight, the temperature is from 20 to 60° C., and the time is from 1 minute to 5 hours.

The acrylic polymer of the invention has a number-average molecular weight of from 300 to 100,000. The number-average molecular weight of the polymer is naturally defined, depending on the reaction condition employed where hydrogen peroxide is used and an acid anhydride is previously reacted with hydrogen peroxide. As having the number-average molecular weight falling within the defined range, but preferably from 1,000 to 25,000, the acrylic polymer of the invention exhibits its characteristics of biodegradability, etc.

In the polymerization methods mentioned above, permaleic acid as formed by the reaction of maleic anhydride with hydrogen peroxide acts as a polymerization initiator for the acrylic monomer. Therefore, as compared with conventional methods, hydrogen peroxide is consumed more efficiently in the methods proposed herein, and remains little in the polymer formed. In addition, according to the proposed methods, it is easy to produce colorless acrylic polymers, especially oligomers having a low molecular weight. The acrylic polymer to be produced in the methods has a number-average molecular weight of from 300 to 100,000 or so, or that is, the molecular weight of the polymer produced therein is not so high to such a degree that the polymer is not biodegradable. Accordingly, the polymer of the invention is favorably used as a biodegradable builder.

The acrylic polymer for the biodegradable builder of the invention is produced in various methods mentioned hereinabove. After having been isolated, or directly without being isolated, the acrylic polymer produced is used as the biodegradable builder of the invention. In the latter, the reaction mixture comprising the polymer formed and containing the residue and even the decomposates of the polymerization initiator and the polymerization catalyst used is directly used as the biodegradable builder.

The acrylic polymer may be produced from the acrylic acids and acid anhydrides mentioned above, to which may be added polymerizable unsaturated compounds of a general formula (IV):

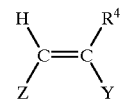

(IV)

wherein $R^4$, Y and Z have the same meanings as above, while using, as the polymerization initiator, a combination of an acrylic acid and hydrogen peroxide, or a combination of an acrylic acid, hydrogen peroxide, and sulfuric acid or an organic sulfonic acid, or a combination of maleic anhydride and hydrogen peroxide. In this process, the combination for the polymerization initiator produces a percarboxylic acid, with which the monomers are polymerized in the same manner as in the above to give the intended acrylic polymer.

As examples of the polymerizable unsaturated compounds of formula (IV), referred to are the same previously mentioned hereinabove.

As has been mentioned hereinabove, maleic anhydride is cleaved with hydrogen peroxide to give permaleic acid, and the resulting permaleic acid, which acts as a polymerization initiator, is reacted with an acrylic monomer and a polymerizable unsaturated compound to give the intended acrylic polymer. Alternatively, in the presence of a reaction product of an acrylic monomer and a polymerizable unsaturated compound with hydrogen peroxide, maleic anhydride may be reacted with hydrogen peroxide and then polymerized with an acrylic monomer to give the intended acrylic polymer. In the latter, it is believed that a mixture of an acrylic polymer having the specific terminal group at its molecular terminal or side chain terminal and having constitutional units derived from the polymerizable unsaturated compound, and an acrylic polymer not having the specific terminal group but having constitutional units derived from the polymerizable unsaturated compound may be obtained.

The biodegradable builder of the invention that consists essentially of the acrylic polymer as obtained in the manner mentioned hereinabove has good chelatability and biodegradability, and is favorably used as a builder for detergent. Combining the builder and surfactant gives a biodegradable detergent composition.

The detergent composition of the invention comprises a builder of the acrylic polymer obtained herein and a surfactant, and has good detergency. After having been used, wastes of the detergent composition are degraded by microorganisms. Any and every surfactant may be in the detergent composition, including, for example, anionic surfactants, cationic surfactants, nonionic surfactants and ampholytic surfactants.

Regarding the amount of the builder and the surfactant to be in the detergent composition, it is desirable that the two are in the composition each in an amount of from 1 to 40% by weight while the remainder of from 20 to 98% by weight comprises any of enzyme, bleaching agent, inorganic builder (e.g., zeolite, sodium carbonate, etc.) and others.

The anionic surfactants employable herein include, for example, soap of fatty acids, salts of alkyl ether-carboxylic acids, salts of N-acylamino acids, salts of alkylbenzenesulfonic acids, salts of alkylnaphthalenesulfonic acids, salts of dialkylsulfosuccinates, salts of α-olefinsulfonic acids, salts of sulfates with higher alcohols, salts of alkyl ether-sulfuric acids, salts of polyoxyethylene-alkyl phenyl ether-sulfuric acids, salts of sulfates with fatty acid alkylolamides, salts of alkyl ether-phosphates, salts of alkylphosphates, etc.

The cationic surfactants include, for example, aliphatic amine salts, aliphatic quaternary ammonium salts, benzalkonium salts, benzetonium chloride, pyridinium salts, imidazolinium salts, etc.

The nonionic surfactants include, for example, polyoxyethylene alkyl ethers, polyoxyethylene alkylphenyl ethers, polyoxyethylene-polyoxypropylene block polymers, polyoxyethylene-polyoxypropylene alkyl ethers, polyoxyethylene-glycerin fatty acid esters, polyoxyethylene-castor oil, polyoxyethylene-sorbitan fatty acid esters, polyoxyethylene-sorbitol fatty acid esters, polyethylene glycol-fatty acid esters, fatty acid monoglycerides, polyglycerin-fatty acid esters, sorbitan-fatty acid esters, fatty acid alkanolamides, polyoxyethylene-fatty acid amides, polyoxyethylene-alkylamines, alkylamine oxides, etc.

The ampholytic surfactants include, for example, carboxybetain-type compounds, salts of aminocarboxylic acids, imidazolinium betain, etc.

Neutralizing the acrylic polymer of the invention with an alkali in an ordinary manner gives a polymer of which the main chain is composed of acrylic monomers and which has a number-average molecular weight of from 300 to 100,000. As having a carboxyl group and having the specific structure noted above, the thus-neutralized polymer is hydrophilic and biodegradable. Therefore, this is extremely useful as a dispersant for inorganic pigments, such as calcium carbonate and clay, which are used for paper coating. To neutralize the acrylic polymer of the invention, preferably used is an aqueous solution of NaOH, KOH or the like.

The dispersant may be used by itself, or may be combined with an additional component of polyvinyl alcohol or the like within the range not interfering with the effect of the invention.

From 0.05 to 2.0 parts by weight of the dispersant may be added to 100 parts by weight of an inorganic pigment such as clay, and the resulting mixture may be dispersed in water. The resulting dispersion may have low viscosity and high fluidity.

As being chelatable, the acrylic polymer of the invention is also usable as a scale. inhibitor in various devises of coolant systems, water pipe lines in boilers, etc. As being well biodegradable, wastes of the acrylic polymer of the invention have little influences on the environment.

Now, the invention is described in more detail with reference to the following Examples, which, however, are not intended to restrict the scope of the invention.

The number-average molecular weight, the constitutional unit content, the Ca-ion chelatability, the biodegradability, the detergency and the dispersing power of the polymer samples prepared hereinunder were measured according to the methods mentioned below.

(1) Number-average Molecular Weight

The number-average molecular weight of each sample was measured through gel permeation chromatography (GPC), using polyacrylic acid as the standard substance.

For this, used was a Waters' system, ALC/GPC 150C Model equipped with a built-in differential diffractometric detector and a column system of Asahipak (GSM-700+ GS310). The mobile phase was acetonitrile/50 mM sodium acetate (3/7); the column temperature was 40° C.; the flow rate was 0.7 ml/min; and the amount of the sample charged was 200 µl.

(2) Number-Average Molecular Weight after Hydrolysis 0.5 g of a sample, 1.5 g of sodium methoxide, 5 ml of methanol and 10 ml of water were put into a 100-ml flask, and heated at 90° C. for 8 hours. After the reaction, the resulting hydrolysate was freeze-dried, and its number-average molecular weight was measured through GPC in the same manner as above.

(3) Determination of Molecular Structure through $^1$H-NMR

The terminal maleic acid residue content and the terminal OH content of each sample, and the presence or absence of ester bonds in each sample were measured through $^1$H-NMR.

For this, used was a JEOL's system, JMN-EX90 Model. A solution of a polymer sample in a solvent of heavy methanol, having a polymer concentration of smaller than 5%, was put into a test tube having a diameter of 5 mmØ, and analyzed at room temperature in a NON mode at 90 MHz, and the data were integrated 32 times (see FIG. 1).

Figure 3:
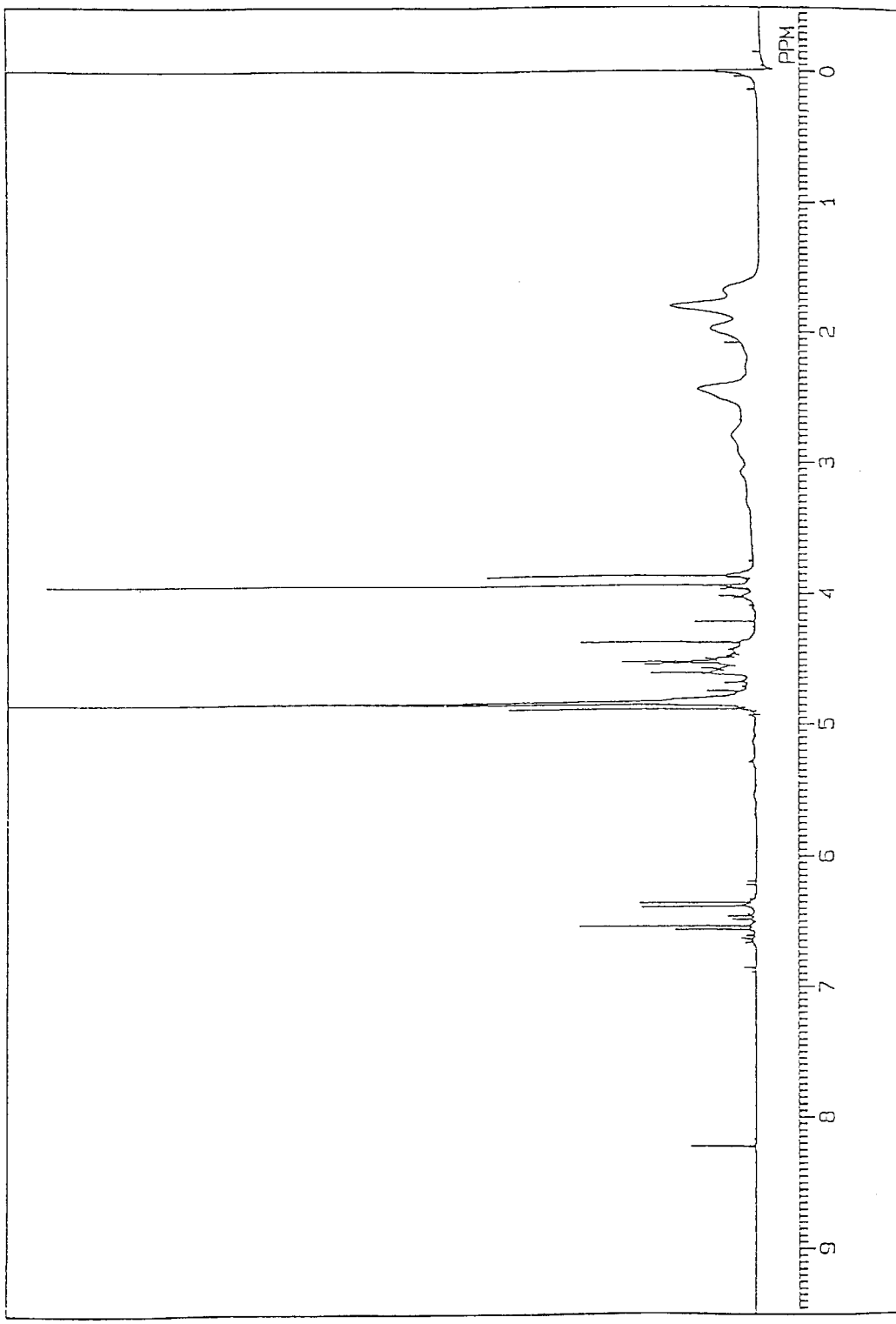
FIG. 3 is a $^1$H-NMR chart (in a solvent of heavy water) of the acrylic polymer obtained in Example 1.

On the other hand, using a system of JEOL Ltd., GSX-400 Model, a solution in heavy water of the polymer sample having a polymer concentration of smaller than 5% was put into a test tube having a diameter of 5 mmØ, and analyzed at room temperature in an SGNON mode at 400 MHz, and the data were integrated 32 times (see FIG. 3).

(4) Ca-ion Chelatability (ability to sequester $Ca^{++}$)

10 mg of a polymer sample was put into a 50-ml beaker, to which was added 50 ml of an aqueous solution containing 0.001 mols/liter of calcium chloride and 0.08 mols/liter of potassium chloride. These were mixed in a thermostat tank at 25° C., and the divalent Ca-ion concentration in the aqueous solution was measured using an ion counter. This was converted into the amount of $CaCO_3$ as trapped by 1 g of the polymer, which indicates the $Ca^{++}$-sequestering ability (mg·$CaCO_3$/g) of the polymer sample.

(5) Biodegradability

According to JIS K0102-1989, the biochemical oxygen demand (BOD) of each polymer sample was obtained from the amount of the dissolved oxygen as consumed by the sample having been stirred at 25° C. for 30 days. Based on this, the degree of biodegradation of the sample was obtained according to the following equation.

$$\text{Degree of Biodegradation } (\%) = (BOD/TOD) \times 100$$

wherein;
BOD is the biochemical oxygen demand of the sample; and
TOD is the theoretical oxygen demand of the sample.

(6) Detergency:

organic soiling components mentioned below, burnt clay and carbon black were mixed in a ratio of 69.7/29.8/0.5 (by weight) to prepare an artificial soiling composition.

| | |
|---|---|
| Oleic Acid | 28.3 wt.pts. |
| Triolein | 15.6 wt.pts. |
| Cholesterol-olein | 12.2 wt.pts. |
| Liquid Paraffin | 2.5 wt.pts. |
| Squalene | 2.5 wt.pts. |
| Cholesterol | 1.6 wt.pts. |
| Gelatin | 7.0 wt.pts. |
| Total | 69.7 wt.pts. |

Clean fabric was soiled with this artificial soiling composition in an wet system using an aqueous solvent, and the thus-soiled fabric was cut into pieces of 5 cm×5 cm each. These pieces had a degree of reflectivity of from 38 to 43%. The surface reflectivity of each soiled piece was measured. Those soiled pieces were subjected to a washing test under the condition mentioned below.

Washing Condition:

| Washing Tester: | Terg-O-Tometer |
|---|---|
| Number of Revolution: | 120 rpm |
| Hardness of Water: | 90 ppm (in terms of $CaCO_3$) |
| Amount of Washing Liquid: | 900 ml |
| Washing Temperature: | 30° C. |
| Concentration of Detergent: | 0.067% |
| Bath Ratio: | 30 times |
| Washing Time: | 10 minutes |
| Rinsing Time: | Two times for 3 minutes each |

Drying: Sandwiched between sheets of filter paper and dried by ironing.

Next, the surface reflectivity of the washed test piece was measured, and the detergency of the detergent tested was obtained according to the following equation.

Detergency (%)=[(K/S of soiled fabric)−(K/S of washed fabric)]/ [(K/S of soiled fabric−(K/S of clean fabric)]×100 wherein;
$K/S=(1-R)^2/2R$ (Kubelka-Munk's equation) in which R indicates the surface reflectivity of fabric.

(7) Evaluation of Dispersing Power

A slurry comprised of calcium carbonate (manufactured by Kanto Chemical Co.) and water in a ratio of 60/40 (by weight) was prepared, to which was added a sodium salt of a polymer sample in an amount of 0.3% by weight relative to the amount of calcium carbonate in the slurry, and stirred for 3 minutes. After having been left static for 1 minute, the viscosity of the resulting mixture was measured with a B-type rotary viscometer (Viscometer VT-04 Model, manufactured by RION Co.), which indicates the dispersing power of the polymer sample tested. The viscosity measured of the slurry to which no polymer was added was 10 dPa·s.

EXAMPLE 1

39.22 g of maleic anhydride and 22.6 g of aqueous, 60% hydrogen peroxide were put into a 500-ml separable flask equipped with a stirrer and a thermocouple, and stirred at 50° C. for 5 minutes to prepare a uniform solution. To this were added 57.6 g of acrylic acid and 10 g of water, at a temperature not higher than 20° C., and stirred. The resulting solution was dropwise put into a separable flask being heated in an oil bath at 100° C., with stirring over a period of 1 hour. After the solution was all put into the flask, it was further stirred under heat for 2 hours. After the reactants were thus reacted, the amount of hydrogen peroxide still remaining in the reaction system was measured. The amount of the non-reacted hydrogen peroxide remained in the system was 0.8% of the original dose of the compound.

The properties of the polymer obtained herein are shown in Table 1, in which are also shown the amount and the yield of the polymer obtained (the same shall apply hereinunder).

Figure 2:
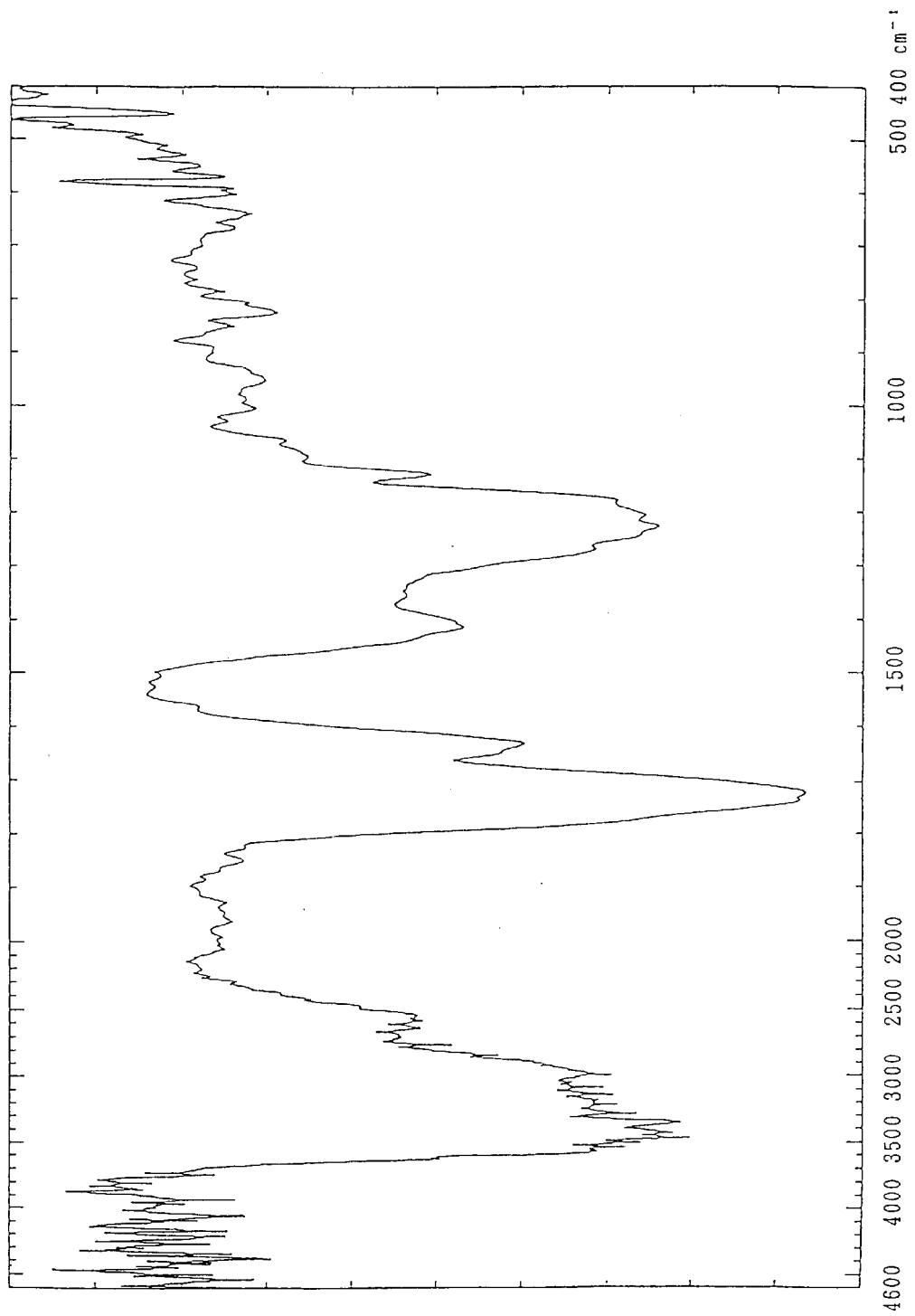
FIG. 2 is an IR chart of the acrylic polymer obtained in Example 1.

FIG. 1 shows the $^1$H-NMR chart of the polymer solution in heavy methanol, in which are seen absorption peaks for C=C at 6.3 ppm, for the ester moiety at 4.3 ppm and for the acrylic polymer backbone at from 1.4 to 3.1 ppm. FIG. 2 shows the IR chart of the polymer, in which are seen absorption peaks for the ester moiety at 1740 $cm^{-1}$, for the carboxyl group at 1726 $cm^{-1}$, and for C=C at 1633 $cm^{-1}$. These data verify that the polymer obtained herein is polyacrylic acid having maleic acid as bonded to the terminal via an ester bond.

Next, the polymer was dissolved in dimethylformamide, and reprecipitated in a solution of methylene chloride. The polymer residue was isolated and dried. The dried polymer was then dissolved in a solvent of heavy water, and the resulting solution was subjected to $^1$H-NMR. FIG. 3 shows the $^1$H-NMR chart of the polymer solution. The ratio of the peak area, b, derived from the protons in —CH=CH— in the terminal maleic acid residue at from 6.3 to 6.6 ppm to the peak area, a, derived from the protons in the main chain of the polymer at from 1.0 to 3.6 ppm, or that is, the ratio [(b/a)×100(%)] was found to be 2.1%. The ratio of the sum, c, of the peak area as derived from the underlined protons in —$\underline{CH_2}$OH at from 3.80 to 3.90 ppm and the peak area as derived from the underlined proton in —$\underline{CH}$(OH)COOH at from 3.94 to 4.10 ppm, to the peak area, b, derived from the protons in —CH=CH— in the terminal maleic acid residue of the polymer, or that is, the ratio [(c/b)×100 (%)] was found to be 200%. After having been hydrolyzed in the manner noted above, the number-average molecular weight of the polymer was measured through GPC to be 710. The data of the polymer obtained herein are shown in Table 1.

EXAMPLE 2

The same process as in Example 1 was repeated, except that the amount of acrylic acid used herein was 28.8 g. After the reaction, the amount of hydrogen peroxide still remained in the reaction system was 0.03%. An aqueous solution of 20 wt. % sodium hydroxide was added to the polymer to make the polymer have a pH of 9.0. The properties of the polymer are shown in Table 1.

EXAMPLE 3

The same process as in Example 1 was repeated, except that the amount of acrylic acid used herein was 72.0 g. After the reaction, the amount of hydrogen peroxide still remained in the reaction system was 0.29%. The properties of the polymer obtained herein are shown in Table 1.

EXAMPLE 4

Using the same device as in Example 1, 45.3 g of aqueous, 60% hydrogen peroxide, 57.6 g of acrylic acid and 1 g of concentrated sulfuric acid were stirred under heat at 30° C. for 2 hours. To this was added 39.2 g of maleic anhydride at room temperature, and stirred for 5 minutes. The resulting solution was dropwise put into a separable flask being heated in an oil bath at 100° C., with stirring over a period of 1 hour. After the solution was all put into the flask, it was further stirred under heat for 2 hours. After the reactants were thus reacted, the amount of hydrogen peroxide still remaining in the reaction system was measured to be 1.7%. The properties of the polymer obtained herein are shown in Table 1.

EXAMPLE 5

The same process as in Example 1 was repeated, except that the amount of acrylic acid used herein was 72.0 g and that the amount of water was 200 ml. After the reaction, the amount of hydrogen peroxide still remained in the reaction system was 1.1%. The properties of the polymer obtained herein are shown in Table 1.

EXAMPLE 6

Using the same device as in Example 1, 39.2 g of maleic anhydride and 22.6 g of aqueous, 60% hydrogen peroxide were stirred at 50° C. for 5 minutes to prepare a uniform solution, to which were added 216.0 g of acrylic acid, 45.3 g of aqueous, 50% hydrogen peroxide and 1 g of concentrated sulfuric acid at a temperature not higher than 20° C., and stirred. The resulting solution was dropwise put into a separable flask being heated in an oil bath at 100° C., with stirring over a period of 2 hours. After the solution was all put into the flask, it was further stirred for 2 hours. After the reactants were thus reacted, the amount of hydrogen peroxide still remaining in the reaction system was measured to be 1.9%. The properties of the polymer obtained herein are shown in Table 1.

COMPARATIVE EXAMPLE 1

Using the same device as in Example 1, 57.6 g of acrylic acid and 22.6 g of aqueous, 60% hydrogen peroxide were mixed. The resulting solution was dropwise put into a separable flask being heated in an oil bath at 100° C., with stirring over a period of 1 hour. After the solution was all put into the flask, it was further stirred under heat for 2 hours.

After the compounds were thus reacted, the amount of hydrogen peroxide still remaining in the reaction system was measured. The amount of the non-reacted hydrogen peroxide remained in the system was 38.8% of the original dose of the compound. The properties of the polymer obtained herein are shown in Table 1.

TABLE 1

|  | Amount of Polymer Formed (g) | Yield (%) | Number-average Molecular Weight | Number-average Molecular Weight after Hydrolysis | $Ca^{++}$ Sequestering Ability (mg/g) | Biodegradability (%) |
|---|---|---|---|---|---|---|
| Example 1 | 95.9 | 99 | 3400 | 710 | 390 | 48 |
| Example 2 | 67.3 | 99 | 1100 | 660 | 380 | 66 |
| Example 3 | 107.8 | 97 | 6800 | 890 | 420 | 35 |
| Example 4 | 92.9 | 96 | 8700 | 840 | 470 | 33 |
| Example 5 | 105.6 | 95 | 13500 | 900 | 440 | 33 |
| Example 6 | 247.5 | 97 | 21600 | 1430 | 490 | 26 |
| Comparative Example 1 | 52.4 | 91 | 150000 | 64000 | 420 | 0 |

EXAMPLE 7

A detergent composition comprising, as a builder, the polymer of Example 1 was tested for its detergency. The data obtained are shown in Table 2.

EXAMPLE 8

A detergent composition comprising, as a builder, the polymer of Example 2 was tested for its detergency. The data obtained are shown in Table 2.

COMPARATIVE EXAMPLE 2

In the same manner as in Example 7, except that A-type zeolite was used in place of the "polymer of Example 1", a detergent composition was prepared and tested. The data obtained are shown in Table 2.

COMPARATIVE EXAMPLE 3

In the same manner as in Example 8, except that A-type zeolite was used in place of the "polymer of Example 2", a detergent composition was prepared and tested. The data obtained are shown in Table 2.

TABLE 2

| Components of Detergent Composition (wt. %) | Example 7 | Example 8 | Comparative Example 2 | Comparative Example 3 |
|---|---|---|---|---|
| LAS | 25 | 20 | 25 | 20 |
| AS | 10 | 10 | 10 | 10 |
| Nonionic Surfactant | — | 5 | — | 5 |
| Polymer of Example 1 | 20 | — | — | — |
| Polymer of Example 2 | — | 20 | — | — |
| A-type Zeolite | — | — | 20 | 20 |
| Sodium Silicate | 10 | 10 | 10 | 10 |
| PEG | 2 | 2 | 2 | 2 |
| Sodium Carbonate | 20 | 15 | 20 | 15 |
| Sodium Sulfate | — | 5 | — | 5 |
| Water | balance | | | |
| Total | 100 | | | |
| Detergency (%) | 59 | 64 | 50 | 52 |

LAS Sodium linear alkylbenzensulfonate
AS Sodium alkylsulfate
PEG Polyethylene glycol

EXAMPLE 9

19.6 g of maleic anhydride and 11.3 g of 60% hydrogen peroxide were put into a flask, and formed into a uniform solution at room temperature. This solution and 14.4 g of acrylic acid were dropwise put into a separable flask being heated at 100° C., using a chemical pump for each. The two being put into the flask were stirred therein, and after all were put into the flask, they were still stirred under heat for 2 hours. After having been cooled, the reaction mixture was made to have a pH of 10 with sodium hydroxide added thereto. The polymer thus obtained had a number-average molecular weight of 1200. Through its $^1$H-NMR, the polymer was found to have ester bonds in the molecule.

According to the method (7) mentioned above for measuring the dispersing power of the polymer, the viscosity of a slurry mixture comprising the sodium salt of the polymer was measured to be 2.8 dPa·s, which is lower than the viscosity of the slurry not containing the polymer of being 10 dPa·s, and than the viscosity of the slurry of being 3.4 dPa·s containing sodium polyacrylate having a molecular weight of 30,000. This supports the high dispersing power of the polymer obtained herein.

EXAMPLE 10 to 15

In the same manner as in Example 9, sodium salts of the polymers obtained in Examples 1, and 3 to 7 were tested to evaluate their dispersing power. The data are shown in Table 3.

Comparative Example 4

In the same manner as in Example 9, the sodium salt of the polymer obtained in Comparative Example 1 was tested to evaluate its dispersing power. The data are shown in Table 3.

TABLE 3

|  | Salt of Polymer Tested | Dispersing Power (dPa·s) |
|---|---|---|
| Example 9 | Example 9 | 2.8 |
| Example 10 | Na salt of Example 1 | 3.1 |
| Example 11 | Na salt of Example 3 | 2.8 |

TABLE 3-continued

| | Salt of Polymer Tested | Dispersing Power (dPa·s) |
|---|---|---|
| Example 12 | Na salt of Example 4 | 2.9 |
| Example 13 | Na salt of Example 5 | 3.0 |
| Example 14 | Na salt of Example 6 | 2.9 |
| Example 15 | Na salt of Example 7 | 2.8 |
| Comparative Example 4 | Na salt of Comparative Example 1 | 3.9 |

INDUSTRIAL APPLICABILITY

The novel acrylic polymer of the invention is characterized by its molecular structure having a specific terminal group and by its relatively low molecular weight. The polymerization initiator used remains little in the polymer. The polymer has good chelatability and is useful as a biodegradable builder. Adding the polymer to various surfactants produces good detergent compositions. The polymer is also usable as a biodegradable dispersant.

In addition, as the method for producing the polymer is simple, the polymer is economical.

What is claimed is:

1. A method for producing an acrylic polymer, comprising polymerizing an acrylic monomer in the presence of an initiator of a percarboxylic acid of a general formula (II):

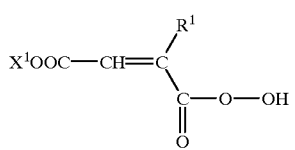

(II)

wherein $R^1$ represents a hydrogen atom, or a methyl group; and $X^1$ represents a hydrogen atom.

2. The method for producing an acrylic polymer as claimed in claim 1 wherein $X^1$ and $R^1$ in formula (II) are hydrogen atoms.

3. A method for producing an acrylic polymer, comprising polymerizing an acrylic monomer in the presence of a reaction product of maleic anhydride and hydrogen peroxide.

4. A biodegradable builder comprising an acrylic polymer as a main component which has, in the molecule, at least one terminal group of $X^1OOC$—$CH$=$CH$—$COO$— wherein $X^1$ represents a hydrogen atom, and has a plurality of ester bonds in the molecular chain and which has a number-average molecular weight of from 300 to 100,000, wherein said acrylic polymer is produced by polymerizing an acrylic monomer in the presence of an initiator of a percarboxylic acid of a general formula (II):

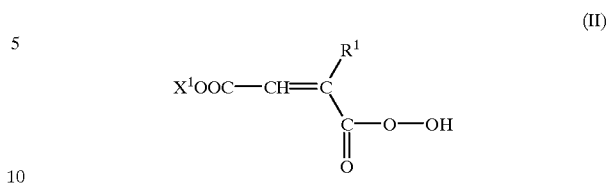

wherein $R^1$ represents a hydrogen atom, or a methyl group; and $X^1$ is as defined above.

5. The biodegradable builder as claimed in claim 4, comprising an acrylic polymer as a main component which, after having been hydrolyzed, has a number-average molecular weight of from 100 to 10,000.

6. A detergent composition comprising from 1 to 40% by weight of at least one biodegradable builder of claim 4, from 1 to 40% by weight of surfactant, and from 20 to 98% by weight of the remainder comprising any of enzyme, bleaching agent and inorganic builder.

7. A detergent composition comprising from 1 to 40% by weight of at least one biodegradable builder of claim 5, from 1 to 40% by weight of surfactant, and from 20 to 98% by weight of the remainder comprising any of enzyme, bleaching agent and inorganic builder.

8. A dispersant as prepared by neutralizing an acrylic polymer with an alkali, said acrylic polymer having, in the molecule, at least one terminal group of $X^1OOC$—$CH$=$CH$—$COO$— wherein $X^1$ represents a hydrogen atom, having a plurality of ester bonds in the molecular chain and having a number-average molecular weight of from 300 to 100,000, wherein said acrylic polymer is produced by polymerizing an acrylic monomer in the presence of an initiator of a percarboxylic acid of a general foimula (II):

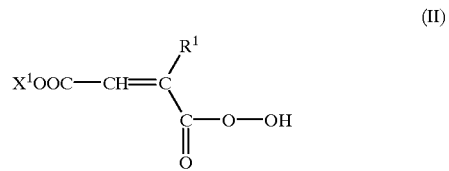

(II)

wherein $R^1$ represents a hydrogen atom, or a methyl group; and $X^1$ is as defined above.

9. The dispersant as claimed in claim 8, which, after having been hydrolyzed, has a number-average molecular weight of from 100 to 10,000.

* * * * *